UNITED STATES PATENT OFFICE 2,691,674

PREPARATION OF 2-ETHYLHEXANOL-1 ACETATE

Ralph C. Schreyer, Richardson Park, Del., assignor to E. I. du Pont de Nemours & Company, Wilmington, Del., a corporation of Delaware No Drawing. Application February 11, 1949, Serial No. 75,972

2 Claims. (Cl. 260—497)

This invention relates to improvements in a process for preparing 2-ethylhexanol-1 and esters thereof.

The esters of 2-ethylhexanol-1 have been prepared heretofore (Kyrides, U. S. 1,923,938). It has also been disclosed that alcohols can be prepared by reaction between olefins, carbon monoxide and hydrogen in the presence of a cobalt-containing catalyst and that such alcohols can be converted to esters by reaction with esterifying reactants, such as organic carboxylic acids (copending application S. N. 4,935, filed January 28, 1948, now United States Patent 2,549,455; also U. S. 2,437,600). For example, butyl acetates can be prepared from propylene, carbon monoxide, hydrogen and acetic acid by the aforesaid method. Prior to the present invention, however, it had not been disclosed that esters of 2-ethylhexanol-1 could be prepared by any such method.

The present invention is based upon the discovery that, under certain specific reaction conditions to be defined hereinafter, the reaction between propylene, carbon monoxide, hydrogen and acetic acid yields the acetate of 2-ethylhexanol-1 in surprisingly high yield.

In accordance with the present invention it has been discovered that at a temperature of from 250° to 290° C. the reaction between propylene, carbon monoxide, hydrogen and acetic acid in the presence of a cobalt acetate catalyst at a pressure of 500 to 1500 atmospheres gives the acetate of 2-ethylhexanol-1 as the chief reaction product. At temperatures between 175° and about 250° C. the chief reaction product is a mixture of butyl acetates (iso and normal), and at temperatures above 290° C. relatively little ester is produced. This selective formation of the acetate of 2-ethylhexanol-1 at the narrow range of temperature specified herein is especially marked when the mol ratio of carbon monoxide to hydrogen in the reaction mixture is about 0.75 to 1.5, preferably about 1:1. The acetic acid:propylene ratio may be varied widely, but it is usually convenient to employ at least about 0.5 mol of acetic acid per mol of propylene. It is usually not desirable from an economic standpoint to employ more than about 3.0 mols of acetic acid per mol of propylene.

The preferred catalyst (or catalyst generator) which is employed in the practice of the invention is cobalt acetate. Other cobalt compounds which are effective include cobalt carbonyl, and cobalt complexes which are formed under the reaction conditions. It should be understood, of course, that cobalt acetate may be produced in situ by reaction between acetic acid and a source of cobalt, such as a cobalt salt of an alkanoic acid other than acetic acid. The quantity of catalyst (or catalyst generator) which is employed is not highly critical, but in general it is desirable to employ at least about 0.01% by weight of the catalyst (or catalyst generator) based upon the weight of cobalt per unit weight of the entire reaction mixture. Best results are generally obtained when the quantity of catalyst (or catalyst generator) is within the range of about 0.1 to 10.0% based upon the weight of cobalt in the entire reaction mixture.

The invention is illustrated further by means of the following example.

*Example.*—A series of experiments was made in which propylene and acetic acid were heated in an autoclave of 325 cc. capacity with carbon monoxide and hydrogen in the presence of a cobalt acetate catalyst under the conditions set forth in the following table. In each instance the reaction product was distilled for recovery of 2-ethylhexyl acetate (B. P. 60° to 63° C. at 1 to 2 mm.). The table records the conversion of propylene to butyl acetate and to 2-ethylhexanol-1 acetate, respectively.

*Preparation of the acetate of 2-ethylhexanol-1*
*(Reaction time one hour)*

1. EFFECT OF TEMPERATURE

| Grams Cobalt Acetate, Co(OAc)$_2$·4H$_2$O | Mols Acetic Acid | Mols Propylene | CO:H$_2$ ratio | Temp., °C. | Pressure, Atms. | Percent Conv. of Propylene to Butyl Acetates | Percent Conv. of Propylene to the Acetate of 2-Ethylhexanol-1 |
|---|---|---|---|---|---|---|---|
| 2 | 2 | 1 | 1 | 270–290 | 550–720 | 20 | 40 |
| 1 | 2 | 1 | 1 | 250–270 | 500–800 | 33.3 | 42 |
| 2 | 2 | 1 | 1 | 193–224 | 350–700 | 51.5 | 13 |
| 2 | 2 | 1 | 1 | 290–312 | 650–750 | (1) | (1) |

2. EFFECT OF PRESSURE

| | | | | | | | |
|---|---|---|---|---|---|---|---|
| 1 | 2 | 1 | 1 | 250–270 | 500–800 | 33.5 | 42 |
| 2 | 2 | 1 | 1 | 250–260 | 340–400 |  | (2) |

3. EFFECT OF CARBON MONOXIDE: HYDROGEN RATIO

| | | | | | | | |
|---|---|---|---|---|---|---|---|
| 1 | 2 | 1 | 1 | 250–270 | 500–800 | 33.5 | 42 |
| 2 | 2 | 1 | 2 | 240–263 | 550–750 | (1) | (1) |
| 2 | 2 | 1 | 0.5 | 245–265 | 600–750 | (1) | (1) |

4. EFFECT OF CATALYSTS

| | | | | | | | |
|---|---|---|---|---|---|---|---|
| 2 + 3% BF$_3$ in acetic acid | 2 | 1 | 1 | 247–255 | 560–720 | (2) | (2) |

1 Less than 5% conversion to esters.
2 Virtually none.

It is to be understood that the foregoing example is illustrative only and that numerous methods of practicing the invention will occur to those who are skilled in the art. For example, the preparation of the acetate of 2-ethylhexanol-1 in accordance with the invention can be carried out either batchwise or continuously. At least a part of the acetic acid reactant may be replaced by acetic anhydride, if desired. Any convenient method for recovering and recycling the excess acetic acid, or acetic acid which has been produced by hydrolysis of the reaction products, may be employed. If desired, the acetate of 2-ethylhexanol-1 in the reaction product can be subjected to alcoholysis, e. g. by reaction with methanol or other alcohol in the presence of an ester interchange catalyst, whereby 2-ethylhexanol-1 is produced together with the acetate of the alcoholic reactant. Alternatively, the 2-ethylhexanol-1 acetate may be subjected to an ester interchange with a higher molecular weight organic acid, such as phthalic acid, whereby acetic acid is liberated and the 2-ethylhexyl ester of the higher molecular weight acid is obtained.

The acetate of 2-ethylhexanol-1 which is obtained in the practice of the invention is widely useful as a solvent and as a source material for the manufacture of high boiling plasticizers. It is also useful as a starting material for the manufacture of 2-ethylhexanol-1, which is a widely used article of commerce.

Although the present invention has been described herein with a certain degree of particularity, it is to be understood that the present disclosure has been made only by way of example and that numerous changes may be made in the details of operation without departing from the spirit and scope of the invention.

I claim:
1. In a process for preparing the acetate of 2-ethylhexanol-1, the steps which comprise heating propylene, carbon monoxide, hydrogen, and acetic acid in a reaction zone at a temperature in the range of 250° to 290° C. under a pressure of 500 to 1500 atmospheres, the mol ratio of CO:H$_2$ being from 0.75 to 1.5, in the presence of cobalt acetate containing 0.1 to 10.% by weight of cobalt based on the weight of the entire reaction mixture, whereby the acetate of 2-ethylhexanol-1 is produced as the chief reaction product, and thereafter withdrawing the resulting mixture from the said reaction zone.

2. In a process for preparing the acetate of 2-ethylhexanol-1, the steps which comprise heating propylene, carbon monoxide, hydrogen and acetic acid in a reaction zone at a temperature in the range of 250° to 290° C. under a pressure of 500 to 1500 atmospheres, the mol ratio of CO:H$_2$ being 1:1, the mol ratio of acetic acid:propylene being from 0.5:1 to 3:1, in the presence of cobalt acetate containing 0.1 to 10.0% by weight of cobalt based on the weight of the entire reaction mixture, whereby the acetate of 2-ethylhexanol-1 is produced as the chief reaction product, and thereafter withdrawing the resulting mixture from the said reaction zone.

References Cited in the file of this patent

UNITED STATES PATENTS

| Number | Name | Date |
|---|---|---|
| 2,448,368 | Gresham et al. | Aug. 31, 1948 |
| 2,549,455 | Gresham et al. | Apr. 17, 1951 |

OTHER REFERENCES

Intelligence Div. Report 4149 on Advances in Acetylene Chemistry, pp. 20–26, Mar. 24, 1945.

Willemart, Bull. Soc. Chim., France, 1947 (pp. 152–157).